United States Patent
Datta et al.

(10) Patent No.: US 8,812,828 B2
(45) Date of Patent: Aug. 19, 2014

(54) METHODS AND APPARATUSES FOR RECOVERING USAGE OF TRUSTED PLATFORM MODULE

(75) Inventors: Shamanna M. Datta, Hillsboro, OR (US); Mahesh S. Natu, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 502 days.

(21) Appl. No.: 12/947,218

(22) Filed: Nov. 16, 2010

(65) Prior Publication Data

US 2012/0124356 A1 May 17, 2012

(51) Int. Cl.
*G06F 9/24* (2006.01)
*G06F 21/57* (2013.01)
*G06F 21/00* (2013.01)
*G06F 11/07* (2006.01)

(52) U.S. Cl.
CPC .............. *G06F 21/575* (2013.01); *G06F 21/57* (2013.01); *G06F 21/00* (2013.01); *G06F 11/0793* (2013.01)
USPC .......................................................... 713/2

(58) Field of Classification Search
CPC ... G06F 11/0793; G06F 21/57; G06F 21/575; G06F 21/00
See application file for complete search history.

(56) References Cited

U.S. PATENT DOCUMENTS

| | | | |
|---|---|---|---|
| 2008/0163383 A1* | 7/2008 | Kumar et al. | 726/29 |
| 2008/0244261 A1* | 10/2008 | Wiseman et al. | 713/155 |
| 2009/0172378 A1* | 7/2009 | Kazmierczak et al. | 713/2 |
| 2009/0222653 A1* | 9/2009 | Findeisen et al. | 713/2 |
| 2009/0249053 A1* | 10/2009 | Zimmer et al. | 713/2 |
| 2009/0328195 A1* | 12/2009 | Smith | 726/16 |
| 2011/0041003 A1* | 2/2011 | Pattar et al. | 714/4.3 |
| 2011/0154010 A1* | 6/2011 | Springfield et al. | 713/100 |

* cited by examiner

*Primary Examiner* — Andrew Nalven
*Assistant Examiner* — Christopher Ruprecht
(74) *Attorney, Agent, or Firm* — Blakely, Sokoloff, Taylor & Zafman LLP

(57) ABSTRACT

Methods and systems to perform platform security in conjunction with hardware-base root of trust logic are presented. In one embodiment, a method includes determining whether a status from an authenticated code module is indicative of an error or not. The method further includes determining whether the hardware-based root of trust logic is enabled based on content in a non-volatile memory location. If the hardware-based root of trust is enabled and the status is indicative of an error, the method further includes writing to the non-volatile memory location to disable hardware-based root of trust logic during a next boot sequence. In one embodiment, a platform initializes and uses the trusted platform module in conjunction with the hardware-based root of trust logic or with a platform-based root of trust logic.

13 Claims, 5 Drawing Sheets

Figure 3

| CHKSUM 1 byte | C_V=0 1 bit | Type 7 bits | Version=0 2 bytes | Reserved 1 byte | Size 3 bytes |
|---|---|---|---|---|---|
| Index 2 bytes | Bit Position 1 byte | Access Width in Bytes 1 byte | Data Register IO Address 2 bytes | Index Register IO Address 2 Bytes | |

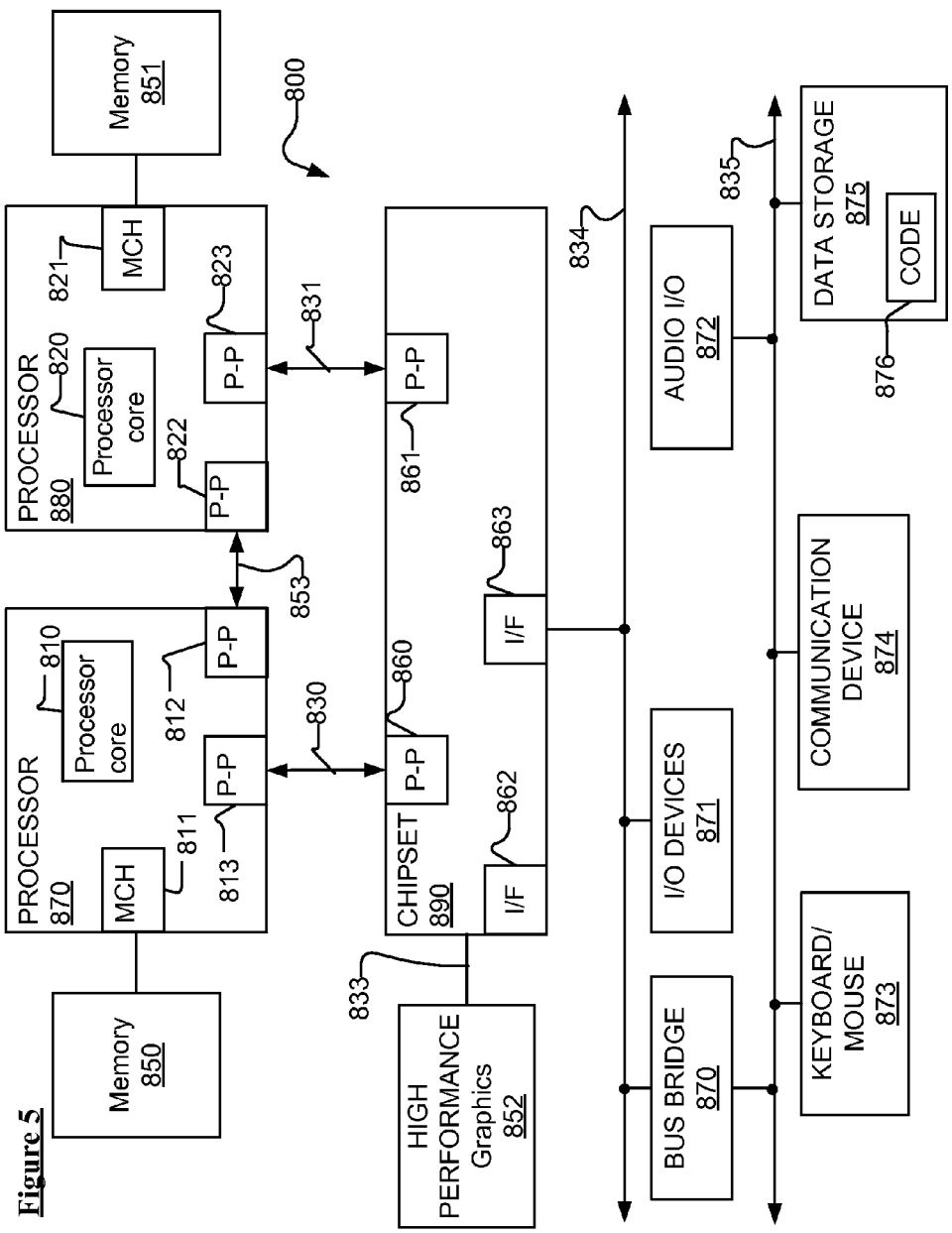

METHODS AND APPARATUSES FOR RECOVERING USAGE OF TRUSTED PLATFORM MODULE

FIELD OF THE INVENTION

Embodiments of the invention relate to a boot process of computer systems; more particularly, embodiments of the invention relate to usage of a trusted platform module.

BACKGROUND OF THE INVENTION

Various computer applications may open computing platforms to virus attacks which compromise computer platform security. The Trusted Computing Group (TCG) develops specifications for enhancing the security of open personal computing platforms. The group defines several mechanisms for improving the assurance level of the PC platform.

Processors incorporate advanced security measurement techniques in conjunction with the basic input/output system (BIOS) to protect the security of a computer platform as a whole. For example, a processor may perform cryptographic measurement on blocks of code in a secure environment during startup to verify the authenticity of the code.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

FIG. 3 is an embodiment of a firmware interface table (FIT) record.

FIG. 5 illustrates a point-to-point computer system for use with one embodiment of the invention.

DETAILED DESCRIPTION OF THE INVENTION

Figure 1:
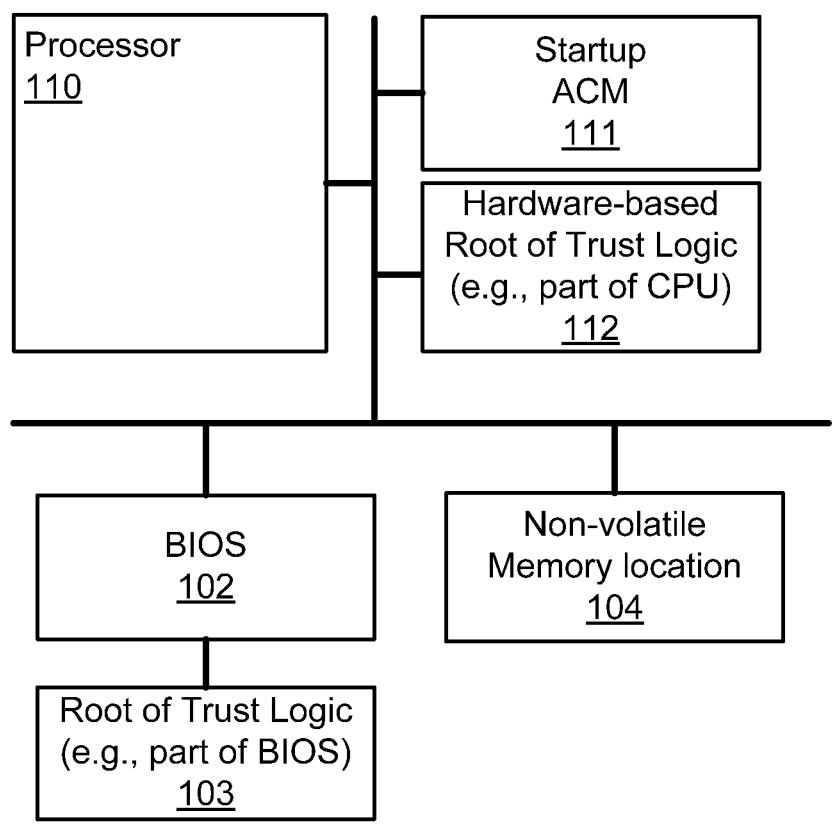
FIG. 1 is a block diagram of an embodiment of a system using processor hardware-based root of trust logic.

Methods and systems to perform platform security in conjunction with hardware-base root of trust logic are presented. In one embodiment, a method includes determining whether a status from an authenticated code module is indicative of an error or not. The method further includes determining whether the hardware-based root of trust logic is enabled based on the content in a non-volatile memory location. If the hardware-based root of trust is enabled and the status is indicative of an error, the method further includes writing to the non-volatile memory location to disable hardware-based root of trust logic during the next boot sequence. In one embodiment, a platform initializes and uses the trusted platform module in conjunction with the hardware-based root of trust logic or with a platform-based root of trust logic.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are primarily discussed in reference to multi-core processor computer systems. However, the methods and apparatus are not so limited, as they may be implemented on or in association with any integrated circuit device or system, such as cell phones, personal digital assistants, embedded controllers, mobile platforms, desktop platforms, and server platforms, as well as in conjunction with other resources.

Overview

Methods and systems to perform platform security in conjunction with hardware-base root of trust logic are presented. In one embodiment, a method includes determining whether a status from an authenticated code module is indicative of an error. The method further includes determining whether the hardware-based root of trust logic is enabled based on the content in a non-volatile memory location. If the hardware-based root of trust is enabled and the status is indicative of an error, the method further includes writing to the non-volatile memory location to disable hardware-based root of trust logic during the next boot sequence. In one embodiment, a computing platform is able to automatically fall back to reduced security mode if the baseline security mode (e.g., processor hardware-based root of trust processing) encounters an error.

FIG. 1 is a block diagram of an embodiment of a system using processor hardware-based root of trust logic. Many related components such as buses and peripherals have not been shown to avoid obscuring the invention. Referring to FIG. 1, the system includes of processor 110, startup authenticated code module 111 (S-ACM 111), hardware-based trusted root of trust logic (TXT 112), basic input/output system 102 (BIOS 102), non-volatile memory location 104, and BIOS root of trust logic 103.

In one embodiment, the aforementioned units are shown as discrete components. Other embodiments are possible where some or all of these units are integrated within a device or within other components. In other embodiments, the aforementioned units are distributed throughout a system in hardware, software, or some combination thereof.

In one embodiment, TXT 112 includes Intel® Trusted Execution Technology (TXT), LT-SX (extending TXT into server platforms), or both. In one embodiment, LT-SX is performed in conjunction with a signed cryptographic binary module referred to herein as S-ACM 111.

In one embodiment, S-ACM 111 is a portion of BIOS authenticated code module (BIOS ACM) that runs at the time of a boot sequence. This code runs before other vendor BIOS code (e.g., BIOS 102) gains control of the system. In one embodiment, the invocation of S-ACM 111 is performed by CPU (central processing unit) hardware, for example, processor 110.

In one embodiment, S-ACM 111 becomes the root of trust of measurement and performs the BIOS binary measurement in conjunction with TXT 112. S-ACM 111 initializes and uses the Trusted Platform Module (TPM) to store the hash of initial BIOS module.

In one embodiment, error(s) returned by S-ACM 111 has to be handled so that BIOS 102 is allowed to use or to initialize the TPM. S-ACM 111 may return status bits that indicate whether the execution of S-ACM 111 is successful or not. In one embodiment, the status bits do not include information about the TPM state. As a result, BIOS 102 is not able to initiate and to use the TPM after S-ACM 111 aborts. In addition, if S-ACM 111 has initialized TPM, BIOS 102 is not able to reinitialize the TPM unless BIOS 102 forces hardware reset. In such situation, if TXT 112 executes S-ACM 111 again during the next boot sequence the same error condition (and TPM initialization) would happen and BIOS will not able to use the TPM following an S-ACM 111 error.

In one embodiment, reasons for an error when running S-ACM 111 include, for example, incorrect inputs into ACM, un-expected errors in writing TPM records, and errors in code execution.

In one embodiment, a firmware interface table (FIT) includes a pointer or a memory address which stores a record referred to as TXT configuration record or TXT Configuration Policy record. In one embodiment, a pointer in the firmware interface table is indicative of where the record is stored. In one embodiment, the TXT configuration record is stored into non-volatile memory 104.

In one embodiment, the TXT configuration record is a type 0Ah record which allows a vendor to enable or to disable TXT 112 by writing to a non-volatile storage (e.g., CMOS/BIOS flash memory, non-volatile memory location 104). Type 0Ah entry is at an address that is accessible by processor 110 at a reset vector. In one embodiment, TXT is enabled by default if no such record is found in FIT.

In one embodiment, S-ACM 111 will not start hardware-based root of trust logic (e.g., TXT 112) if the record shows that the feature is disabled. In one embodiment, S-ACM 111 will not initialize the TPM if the record shows that the feature is disabled. As a result, BIOS 102 is able to initialize the TPM and to use the TPM for other TPM applications if TXT 112 has not started TPM initialization.

In one embodiment, non-volatile memory location 104 stores information indicative of whether TXT 112 is enabled to perform the hardware-based root of trust. In one embodiment, TXT 112 is processor-based root of trust logic operable to perform binary measurement on basic input/output system code and to perform TPM initialization.

In one embodiment, BIOS 102 includes firmware modules and is a part of a unified extensible firmware interface (UEFI).

In one embodiment, a firmware module (e.g., BIOS 102) determines status associated with S-ACM 111 (which maybe based on results from executing TXT 112). If the status is indicative of an error, the firmware module writes to non-volatile memory location 104 to disable the TXT 112 in a subsequent boot sequence. In one embodiment, the firmware module causes hardware reset if the status is indicative of an error. The BIOS may continue the trusted platform boot process if there is no error indicated in the status.

The process and the FIT record will be described in further detail below with additional references to the remaining figures.

Figure 2:
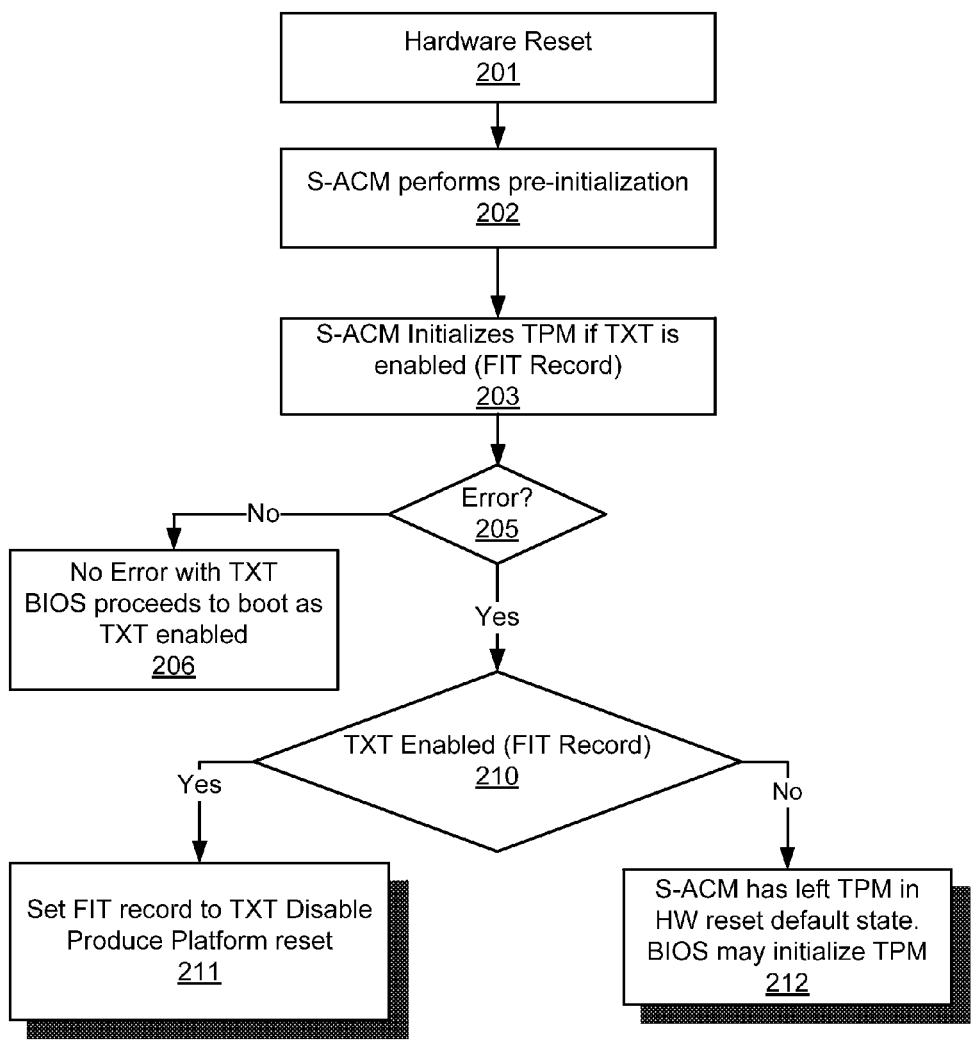
FIG. 2 is a flow diagram of one embodiment of a process to disable hardware-based root of trust logic.

FIG. 2 is a flow diagram of one embodiment of a process to disable hardware-based root of trust logic. The process is performed by processing logic that may comprise hardware (circuitry, dedicated logic, etc.), software (such as one that is run on a general purpose computer system or a dedicated machine), or a combination of both. In one embodiment, the process is performed in conjunction with a computer system (e.g., the computer system with respect to FIG. 4).

Referring to FIG. 2, in one embodiment, processing logic begin by performing pre-initialization in response to hardware reset (process block 201; process block 202).

In one embodiment, processing logic initializes the TPM (Trusted Platform Module) if the hardware-based root of trust logic is enabled (process block 203). In one embodiment, the hardware-based root of trust logic is a processor-based root of trust logic (e.g., TXT 112 with respect to FIG. 1). Processing logic performs BIOS measurement in conjunction with S-ACM.

In one embodiment, processing logic determines status bits returned by the S-ACM (process block 205). In one embodiment, the status bits are the state of SPAD FIT status bits.

In one embodiment, processing logic determines that no error has occurred (process block 206). Processing logic determines that S-ACM has completed with no errors (e.g., FIT status bits—"1xxx_xxxx_xxxx-xxxx") and the TPM is enabled. Processing logic determines that the TPM has been initialized with a startup-command (e.g., TPM startup) and processing logic will not perform further initialization on the TPM. In one embodiment, processing logic proceeds to use TPM to measure/hash other components (e.g., extended BIOS components). The TPM is ready for use for other TPM-aware applications.

In one embodiment, S-ACM execution may result in an error status because of software errors, incorrect configuration, hardware malfunction, etc. If the S-ACM returns an error, the hardware-based root of trust feature is not longer available as the TPM may be left in an indeterminate/unusable state. In one embodiment, processing logic provides a graceful fall-back mechanism (e.g., using a reduced security mode). In one embodiment, if the status bits indicate S-ACM has finished with one or more errors (e.g., FIT status bits— "0xxx_xxxx_xxxx-xxxx"), then processing logic will read from a non-volatile memory location by referring to a FIT type (0Ah) record. In one embodiment, processing logic determines whether hardware-based root of trust logic is enabled based at least in part on content in a non-volatile memory location (process block 210).

In one embodiment, processing logic writes to the non-volatile memory location to disable the hardware-based root of trust logic in a next boot sequence if the status bits are indicative of an error has occurred and the hardware-based root of trust logic is enabled (process block 211). Processing logic also produces a hardware reset (e.g., a platform reset).

In one embodiment, if the hardware-based root of trust logic is otherwise disabled, the S-ACM has not changed the system state including the TPM state. Therefore the TPM is in a hardware reset default state (process block 212). In one embodiment, processing logic (e.g., vendor BIOS) acts as the root of trust and initializes the TPM. In one embodiment, a computing platform performs a boot process that is identical the boot process of a platform without hardware-based root of trust logic, if the hardware-based root of trust logic is disabled.

FIG. 3 is an embodiment of a firmware interface table (FIT) record. In one embodiment, the record is a type 0Ah record of the FIT table. The record is stored in a non-volatile memory location, such as, for example, a flash memory or CMOS memory of a computing platform.

In one embodiment, referring to FIG. 3, address field contains a TXT_Config_Policy_Ptr structure. This structure contains the address where the "TXT Configuration Policy" information resides. The version field is set to 0 if the TXT_Config_Policy_Ptr describes an Indexed IO type pointer. The version field is set to 1 if the TXT_Config_Policy_Ptr describes a flat memory pointer.

In one embodiment, if indexed IO type pointer is used, the Address field holds a structure of the type INDEX_IO_ADDRESS. This structure contains the IO addresses of the index and data register, access width, and position of the bit that holds the TPM policy. The INDEX_IO_ADDRESS location is accessible at reset without any hardware initialization. In one embodiment, if flat memory type pointer is used, the Address field holds a 64-bit memory address. Bit (x) at this address holds the TXT Configuration Policy.

The "TXT Configuration Policy" indicates whether hardware-based root of trust logic (e.g., TXT) is enabled (e.g., TXT Configuration Policy="1") or disabled (e.g., TXT Configuration Policy="0"). The default setting is to enable hardware-based root of trust logic. In other words, if the TXT_Config_Policy_Ptr structure is not present or is invalid, the S-ACM operates as if the hardware-based root of trust logic is enabled.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 4:
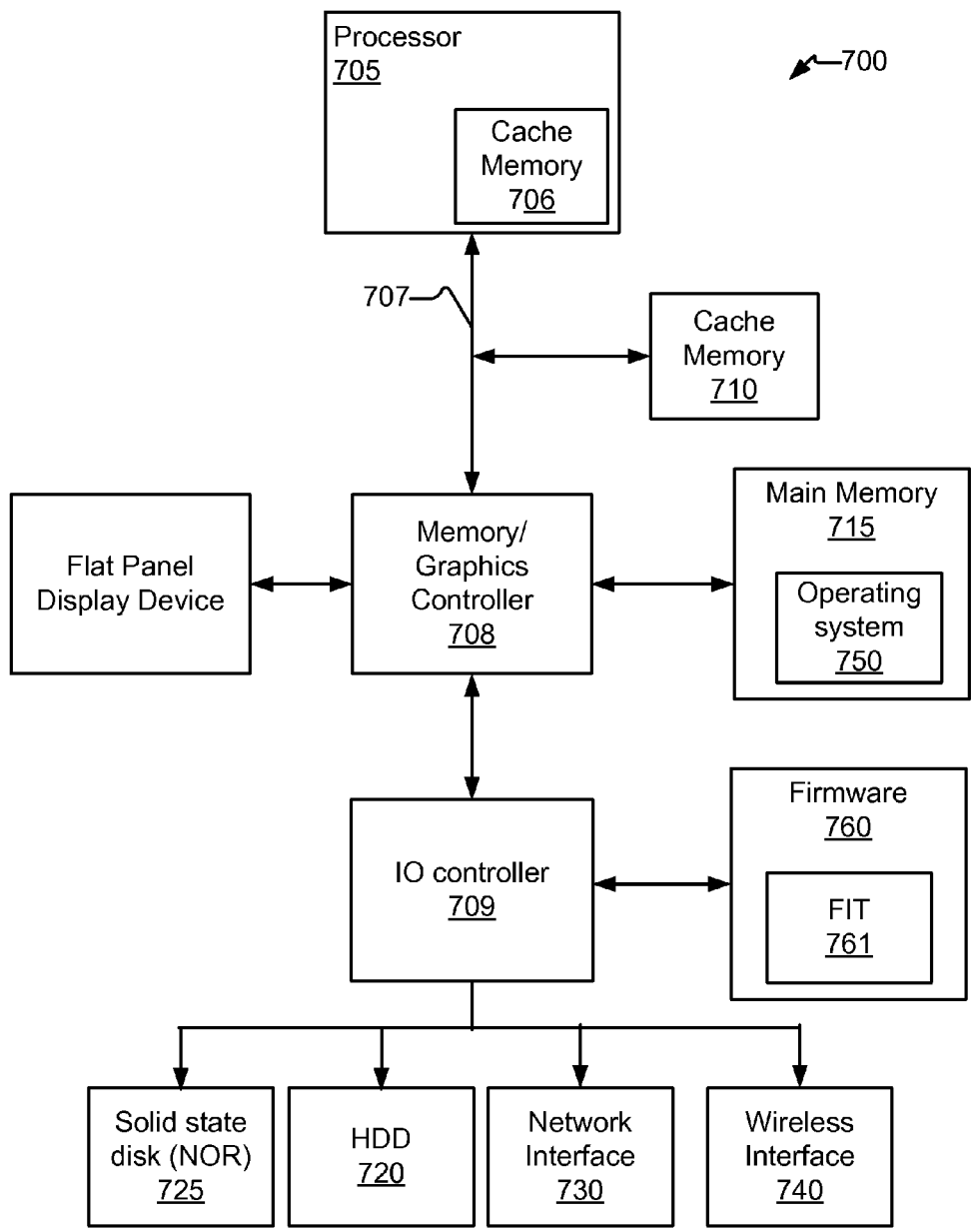
FIG. 4 illustrates a computer system for use with one embodiment of the present invention.

FIG. 4 is a block diagram illustrating a computer system in accordance with one embodiment of the invention. In one embodiment, the computer system includes processor 705, memory/graphics controller 708, I/O controller 709, main memory 715, and firmware device 760. In one embodiment, processor 705 accesses data from level 1 (L1) cache memory 706, level 2 (L2) cache memory 710, and main memory 715.

In one embodiment, processor 705 is coupled to memory/graphics controller 708. Memory/graphics controller 708 is coupled to I/O controller 709, which in turn, coupled to firmware device 760, solid state disk 725, hard disk drive 720, network interface 730, and wireless interface 740. In one embodiment, main memory 715 loads operating system 750.

In one embodiment, main memory 715 may be implemented in various memory sources, such as dynamic random-access memory (DRAM), hard disk drive (HDD) 720, solid state disk 725 based on NVRAM technology, or a memory source located remotely from a computer system via network interface 730 or via wireless interface 740 containing various storage devices and technologies. The cache memory may be located either within the processor or in close proximity to the processor, such as on the processor's local bus 707.

In one embodiment, firmware device 760 is a system read only memory (ROM) provided by third party vendors or a non-volatile memory device. In one embodiment, processor 705 is coupled to firmware device 760. In one embodiment, firmware device 760 is located in the same package as processor 705. In other embodiments, firmware device 760 is external to a processor package.

In one embodiment, firmware device 760 contains Basic Input/Output System (BIOS) of the computer system or UEFI firmware modules. The BIOS includes additional segments of code (i.e. routines) that perform system setup during a boot process. In one embodiment, firmware device 760 further includes firmware interface table (FIT 761).

In one embodiment, I/O controller 709 includes one or more I/O host controllers that control one or more I/O interconnects (not shown). In one embodiment, I/O controller 709 is coupled to processor 709 with a single link (i.e., interconnect or bus). In one embodiment, this coupling may be accomplished over a series of links. In one embodiment, processor 705 is coupled over a first link (e.g., local bus 707) to memory/graphics controller 708 (where the memory complex interfaces with a memory subsystem), and memory/graphics controller 708 is coupled to I/O controller 709 over a second link.

In many embodiments, at least one processor 705 is present. In one embodiment, multiple processor cores are present in the system (not shown). In one embodiment, multiple processors, each with single or multi-cores are present in the system (not shown). In embodiments where there are multiple cores and/or multiple processors in the system, a single master core is designated to perform boot and other such system handling processes in the system. Thus, in these embodiments, processor 705 is the master core.

In one embodiment, processor 705 and cache memory 706 are on a same substrate or in a same package. In one embodiment, processor 705, cache memory 706, memory/graphics controller 708, and I/O controller 709 are on a same substrate or in a same package.

Other embodiments of the invention, however, may exist in other circuits, logic units, or devices in conjunction with the system of FIG. 4. Furthermore, other embodiments of the invention may be distributed throughout several circuits, logic units, or devices illustrated in FIG. 4.

FIG. 5 illustrates a point-to-point computer system in conjunction with one embodiment of the invention.

FIG. 5, for example, illustrates a computer system that is arranged in a point-to-point (PtP) configuration. In particular, FIG. 5 shows a system where processors, memory, and input/output devices are interconnected by a number of point-to-point interfaces.

The system of FIG. 5 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 5.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
   performing pre-initialization of a trusted platform module (TPM) in response to a hardware reset; and
   determining whether a hardware-based root of trust logic is enabled or disabled based on a configuration policy record stored in a non-volatile memory location,
   wherein if the hardware-based root of trust logic is enabled:
      initializing, via an authenticated code module, the TPM and performing binary measurement on basic input/output system (BIOS) code using the hardware-based root of trust logic, and
      determining whether a status returned from the authenticated code module is indicative of an error, wherein a firmware interface table (FIT) provides status bits relating to the error,
      wherein if the status is not indicative of an error:
         performing a trusted platform process on extended BIOS components using a BIOS root of trust logic,
      wherein if the status is indicative of an error:
         writing to the non-volatile memory location to disable the hardware-based root of trust logic in a next boot sequence, and
         causing a hardware reset, and
   wherein if the hardware-based root of trust logic is disabled:
      initializing, via the BIOS, the TPM and performing the trusted platform process using the BIOS root of trust logic.

2. The method of claim 1, further comprising facilitating a reduced security mode as a fallback mechanism if the authenticated code module returns a status indicative of an error and the hardware-based root of trust logic is enabled, wherein the status bits indicate whether the error relates to one or more of incorrect inputs into the authenticated code module, un-expected errors in writing TPM records, and errors in code execution, and wherein the error further relates to one or more of software errors, hardware malfunction, and incorrect configuration.

3. The method of claim 1, wherein:
   the authenticated code module comprises a start-up authenticated code module which is a part of the hardware-based root of trust logic;
   the hardware-based root of trust logic is part of a central processing unit (CPU) and comprises a processor-based root of trust logic; and
   the BIOS root of trust logic is part of the BIOS.

4. The method of claim 1, wherein:
   the non-volatile memory location is modifiable by a firmware module; and
   the BIOS includes the firmware module and is part of a unified extensible firmware interface (UEFI).

5. The method of claim 1, wherein:
   a pointer in the FIT is indicative of a location where the configuration policy record is stored in the non-volatile memory; and
   the configuration policy record allows writing to the non-volatile memory location to enable or disable the hardware-based root of trust.

6. A non-transitory computer readable storage medium including data storing instructions thereon that, when accessed by a machine, cause the machine to perform one or more operations comprising:
   performing pre-initialization of a trusted platform module (TPM) in response to a hardware reset; and
   determining whether a hardware-based root of trust logic is enabled or disabled based on a configuration policy record stored in a non-volatile memory location,
   wherein if the hardware-based root of trust logic is enabled:
      initializing, via an authenticated code module, the TPM and performing binary measurement on basic input/output system (BIOS) code using the hardware-based root of trust logic, and determining whether a status returned from the authenticated code module is indicative of an error, wherein a firmware interface table (FIT) provides status bits relating to the error, wherein if the status is not indicative of an error:
performing a trusted platform process on extended BIOS components using a BIOS root of trust logic, wherein if the status is indicative of an error:
writing to the non-volatile memory location to disable the hardware-based root of trust logic in a next boot sequence, and
causing a hardware reset, and wherein if the hardware-based root of trust logic is disabled:
initializing, via the BIOS, the TPM and performing the trusted platform process using the BIOS root of trust logic.

7. The non-transitory computer readable storage medium of claim 6, wherein the one or more operations further comprise facilitating a reduced security mode as a fallback mechanism if the authenticated code module returns a status indicative of an error and the hardware-based root of trust logic is enabled, wherein the status bits indicate whether the error relates to one or more of incorrect inputs into the authenticated code module, un-expected errors in writing TPM records, and errors in code execution, and wherein the error further relates to one or more of software errors, hardware malfunction, and incorrect configuration.

8. The non-transitory computer readable storage medium of claim 6, wherein:
the authenticated code module comprises a start-up authenticated code module which is a part of the hardware-based root of trust logic;
the hardware-based root of trust logic is part of a central processing unit (CPU) and comprises a processor-based root of trust logic; and
the BIOS root of trust logic is part of the BIOS.

9. The non-transitory computer readable storage medium of claim 6, wherein:
the non-volatile memory location is modifiable by a firmware module;
the BIOS includes the firmware module and is part of a unified extensible firmware interface (UEFI);
a pointer in the FIT is indicative of a location where the configuration policy record is stored in the non-volatile memory; and
the configuration policy record allows writing to the non-volatile memory location to enable or disable the hardware-based root of trust.

10. An apparatus comprising:
an authenticated code module configured to return a status indicative of an error;
a firmware module;
a firmware interface table (FIT) configured to provide status bits relating to the error;
a hardware-based root of trust logic;
a BIOS root of trust logic;
a non-volatile memory location configured to store a configuration policy record; and
processing logic configured to:
perform pre-initialization of a trusted platform module (TPM) in response to a hardware reset; and
determine whether the hardware-based root of trust logic is enabled or disabled based on the configuration policy record, wherein if the hardware-based root of trust logic is enabled, the processing logic is further configured to:
initialize, via an authenticated code module, the TPM and perform binary measurement on basic input/output system (BIOS) code using the hardware-based root of trust logic, and
determine whether a status from the authenticated code module is indicative of an error based on the status bits, wherein if the status is not indicative of an error, the processing logic is further configured to:
perform a trusted platform process on extended BIOS components using a BIOS root of trust logic, wherein if the status is indicative of an error, the processing logic is further configured to:
write to the non-volatile memory location to disable the hardware-based root of trust logic in a next boot sequence, and
cause a hardware reset, and wherein if the hardware-based root of trust logic is disabled, the processing logic is further configured to:
initialize, via the BIOS, the TPM and perform the trusted platform process using the BIOS root of trust.

11. The apparatus of claim 10, wherein the processing logic is further configured to facilitate a reduced security mode as a fallback mechanism if the authenticated code module returns a status indicative of an error and the hardware-based root of trust logic is enabled, wherein the status bits indicate whether the error relates to one or more of incorrect inputs into the authenticated code module, un-expected errors in writing TPM records, and errors in code execution, and wherein the error further relates to one or more of software errors, hardware malfunction, and incorrect configuration.

12. The apparatus of claim 10, wherein:
the authenticated code module comprises a start-up authenticated code module which is part of the hardware-based root of trust logic;
the hardware-based root of trust logic is part of a central processing unit (CPU) and comprises a processor-based root of trust logic; and
the BIOS root of trust logic is part of the BIOS.

13. The apparatus of claim 10, wherein:
the non-volatile memory location is modifiable by the firmware module;
the BIOS includes the firmware module and is part of a unified extensible firmware interface (UEFI);
a pointer in the FIT is indicative of a location where the configuration policy record is stored in the non-volatile memory; and
the configuration policy record allows writing to the non-volatile memory location to enable or disable the hardware-based root of trust.

* * * * *